Feb. 14, 1939.   J. F. TIMBERLAKE   2,146,922
LOOM FOR WEAVING AND ELECTRICAL CONTROL THEREFOR
Filed Feb. 19, 1936    10 Sheets-Sheet 1

Inventor
Journey F. Timberlake
Bailey & Parson
Attorneys

Feb. 14, 1939. J. F. TIMBERLAKE 2,146,922
LOOM FOR WEAVING AND ELECTRICAL CONTROL THEREFOR
Filed Feb. 19, 1936 10 Sheets-Sheet 2

Fig. 2.

Inventor
Journey F. Timberlake

Inventor
Journey F. Timberlake

Feb. 14, 1939.   J. F. TIMBERLAKE   2,146,922
LOOM FOR WEAVING AND ELECTRICAL CONTROL THEREFOR
Filed Feb. 19, 1936   10 Sheets-Sheet 5

Fig. 8.

Inventor
Journey F. Timberlake
By Bailey & Larson
Attorneys

Feb. 14, 1939.  J. F. TIMBERLAKE  2,146,922
LOOM FOR WEAVING AND ELECTRICAL CONTROL THEREFOR
Filed Feb. 19, 1936    10 Sheets-Sheet 8

Inventor
Journey F. Timberlake
By Bailey & Parson
Attorneys

Patented Feb. 14, 1939

2,146,922

UNITED STATES PATENT OFFICE 2,146,922

LOOM FOR WEAVING AND ELECTRICAL CONTROL THEREFOR

Journey F. Timberlake, Charlottesville, Va.

Application February 19, 1936, Serial No. 64,745

13 Claims. (Cl. 139—11)

This invention relates to looms for weaving textiles and more particularly to automatic, electrically controlled looms.

It is known to me that looms and parts therefor have been for generations the subject of inventive thought. During all of this time new mechanisms have been progressively evolved. A few of the developments which are known by me to be patented are electrically operated looms with thread break indicators, looms with solenoids for operation of the various parts, looms with separate, automatic mechanisms for refilling shuttle boxes and looms with the separate parts operated by some fluid pressure medium. Also, there are in operation looms with a single prime mover connected to the various parts by systems of cams, gears, chains or the like.

But all of the looms known to me are mechanically complex. They consist of a great multiplicity of parts a great many of which are in places accessible only with great difficulty. The assembly of the looms is such that these parts must be replaced, and at great expense, as soon as they become slightly worn. This is particularly true of looms in which cams, gears, or chains are used.

It is an object of my invention to simplify the construction of looms by reducing the number of working parts. As a further object, my invention is directed to the construction of a loom from which cams, shafts and the like have been eliminated and in which the number of chains, belts, and the like has been reduced to a minimum.

While looms have been operated throughout their various parts by progressively energized solenoids or by progressively operated fluid pressure chambers, they have been attended with many disadvantages. Solenoids have a limited sphere of influence and their power is small in ratio to their bulk. It has been necessary to place the solenoids in situations where they interfere with the operation of the loom parts. The same may be said of fluid pressure systems. In addition the latter have the disadvantage that leaks develop and a separate power plant must be used to develop the pressure. The present loom has the advantage that the prime movers are compact, economical to operate and susceptible of being positioned in non-interfering locations.

Heretofore, looms have been so constructed that they could be used to advantage with only one type or weight of thread. It was known that the yarns or threads used to make various types of textiles had variations in tensile strength. A loom which was suitable for weaving canvas, for instance, would be impractical for use in weaving a light woolen material. Since the threads from which the latter was made had a low tensile strength, the speed at which the various parts of the loom operated, of necessity, was changed. Not all parts needed to be changed in speed the same amount because the various operations upon the various threads did not exert the same strain. The warp threads and the weft threads and the filler threads all undergo various conditions. Yet, old looms were so constructed that a change in the speed of one part resulted in the same degree of change throughout. Of course, known looms could have been reconstructed for each change of conditions. New gear ratios or new cams of different patterns could have been used. The delay and cost is prohibitive. Also, it was often found that the amount of change figured on paper was theoretically correct but impractical.

An advantage attained by my novel loom is its instantaneous adaptability. It is an object of my invention to operate the various parts of my loom with easily accessible, variable-speed motors.

A further object resides in the arrangement of the prime movers for the various parts and the coordination of these prime movers and parts. The various circuit opening and closing devices are so arranged that a particular part of the mechanism must complete its function before another portion begins its function. Breakage of parts is prevented since this object has been attained. Yet another object and advantage may be seen from the fact that I use a plurality of prime movers which may be economically operated from a low voltage circuit whereas known looms require a costly high voltage circuit.

The present practice of weaving on mechanical or power looms is that each shuttle carries only a small amount of thread or yarn. Where heavy material is being woven or where a heavy filler is being used, frequent changes of the shuttle are required. I have found that I can use a large amount of weft material and it is an object of this invention to arrange the harness such that a large shed is made. A further object is the elimination of frequent shuttle changes.

While I have declared certain objects, it will be manifest to persons skilled in the art that other results have been accomplished as will appear from the following description of my loom with particular reference to the appended drawings and wherein like reference numerals refer to like parts throughout the various views and in which:

Fig. 8 is a front elevational view partially in section along line 8—8 of Fig. 2.

Fig. 9 is a sectional view along line 9—9 of Fig. 1 showing the lay mechanism.

For the sake of clearness the inventive improvements will first be described broadly as applied to a simple type of loom having but two harnesses and consequently but two sets of warp threads. These harnesses are disposed so that the two sets of warp threads form a shed. A shuttle is designed to pass through this shed to deposit a weft thread. Such a loom is, of course, provided with a lay having a comb or beat-up arrangement. After the weft thread has been deposited in the shed the lay is designed to move so that the comb or beat-up arrangement forces or packs the weft thread up against the fabric which already has been woven.

Such simple looms are, of course, also provided with a harness changing mechanism, which, after a weft thread has been packed by the comb, will change the position of the harnesses to form a new shed.

Disposed at various places on the loom are control switches, preferably electric in nature. These switches are adapted to be actuated when certain parts of the loom assume certain positions. The relationship between these switches and the various parts of the loom is such as to control the various steps easily and accurately and in such a manner as to avoid accidents, breakage of parts, breakage of threads and consequent loss of time, and so as to cause the loom to run smoothly and efficiently.

The arrangement of switches is such that the shuttle cannot begin its passage through the shed unless all conditions are satisfactory for such passage. Moreover, the lay mechanism for beating up the weft thread will not begin operation until the shuttle has completed its passage through the shed; the shed will not be changed until the lay mechanism movement has the position where it will not interfere; and the shuttle will not operate until the harnesses have changed position so as to change the shed.

The inventive features of my controlled loom will be described hereinafter in detail in connection with a loom of the type mentioned. The control, however, is effected electrically for the most part through electric motors, solenoids and switches.

In such instance three motors are employed. One of these is adapted to operate the lay mechanism and the harness changing mechanism. The other two are carried by the lay mechanism one at each end thereof and are for operating the shuttle which is also mounted to travel in a track carried by the lay mechanism. The shuttle actuating mechanism operated by these two motors is, however, controlled by solenoids so that the shuttle can only move in a specified direction and then only when and while the proper solenoid is energized.

The lay is also controlled by one or more solenoids so that it will not move to beat up the weft unless, and until such solenoids are energized.

In the specific example of the invention to be described four electric tilting mercury switches are employed each of which has a pair of contacts at each end. Of these switches one is disposed on the lay at each end of the path of movement of the shuttle in such a way as to tilt in one direction when the shuttle is at that end of its path, and to return to their other position when it is not. The other two switches are on arms the position of which is adapted to be reversed by the harness changing mechanism during the second half of the harness changing cycle.

The four switches and the solenoids are connected in a number of circuits, each of which is adapted when closed to energize a solenoid and consequently cause the operation of a part of the loom. The arrangement is such, however, that all circuits but one will be dead at any one time, and the operating elements are thus controlled so that each will carry out its proper function only when its circuit is closed and will not and cannot operate except in its predetermined successive turn. This arrangement, which prevents one part from operating except at a specified time and in a specified order, eliminates breakage of parts and also breakage of many threads as would occur, for example, should the lay beat up the weft while the shuttle was intermediate the ends of its path of movement, or should the harnesses change while the lay was moving and the shuttle had not finished its movement.

The construction I have devised permits changing the speed of the various parts of the loom easily to accommodate threads of various tensile strengths. Moreover, the use of a plurality of circuits and a plurality of small operating motors enables the power to be supplied from an ordinary power line without the necessity of using a transformer. Using a plurality of small motors also makes for more efficient, smoother operation and reduces and distributes vibration to the point where it will not be damaging.

Aside from the advantages mentioned above, particular note should be paid to the novel harness changing mechanism disclosed which also operates a part of the control structure; also the means employed for increasing the size of the shed to permit the use of a larger shuttle and more or heavier weft thread; the novel lay operating mechanism and stop mechanism therefor; the lay structure itself which may be easily replaced while cloth is in the loom should parts become broken; and finally the novel take-up mechanism. While the shuttle motion mechanism is also of real merit, it is not emphasized here since it is the subject matter of my copending application, Serial No. 57,043, filed December 31, 1935.

Figure 1:
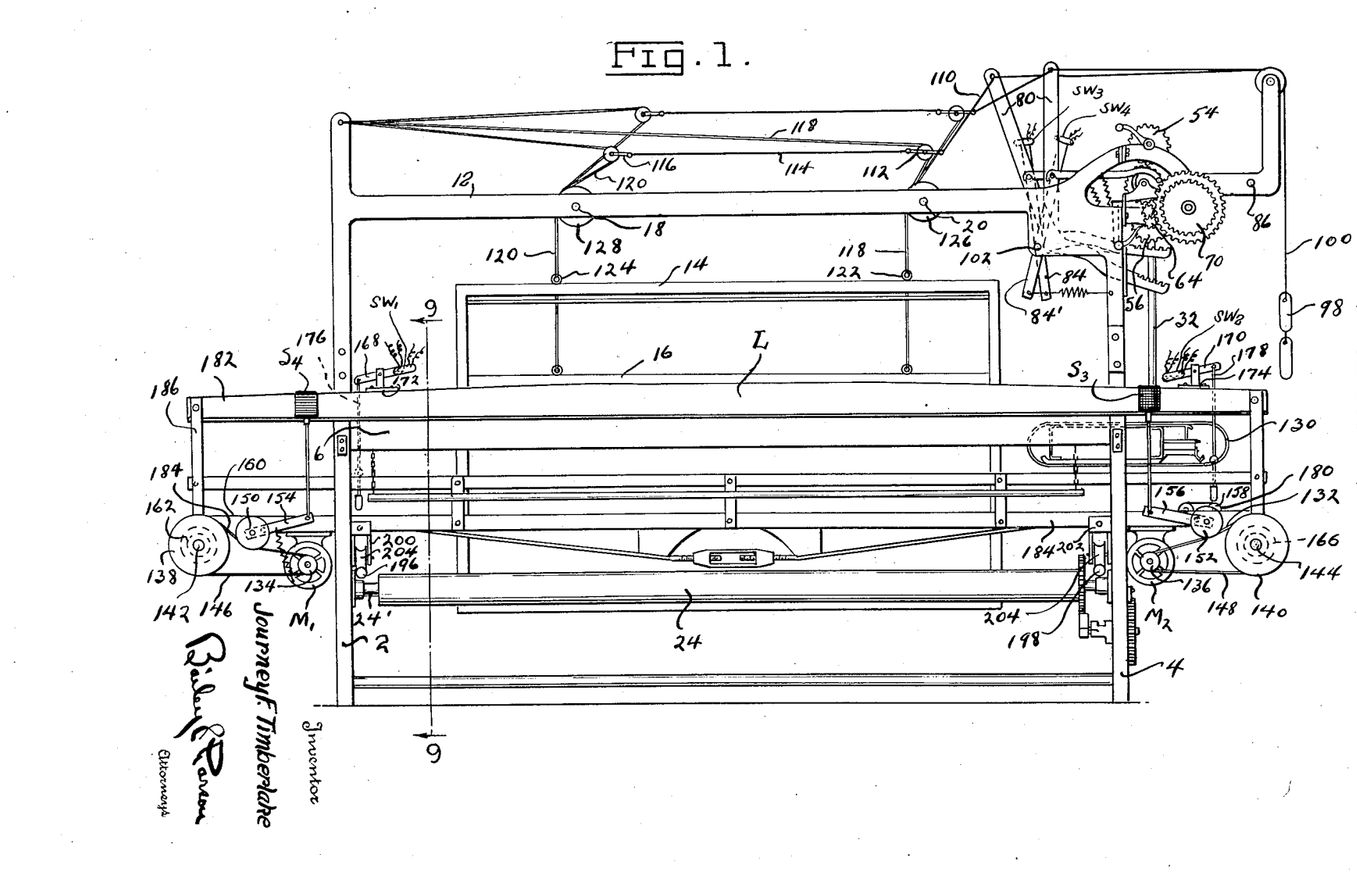
Fig. 1 is an elevational view from the cloth end of the loom.
Figure 2:
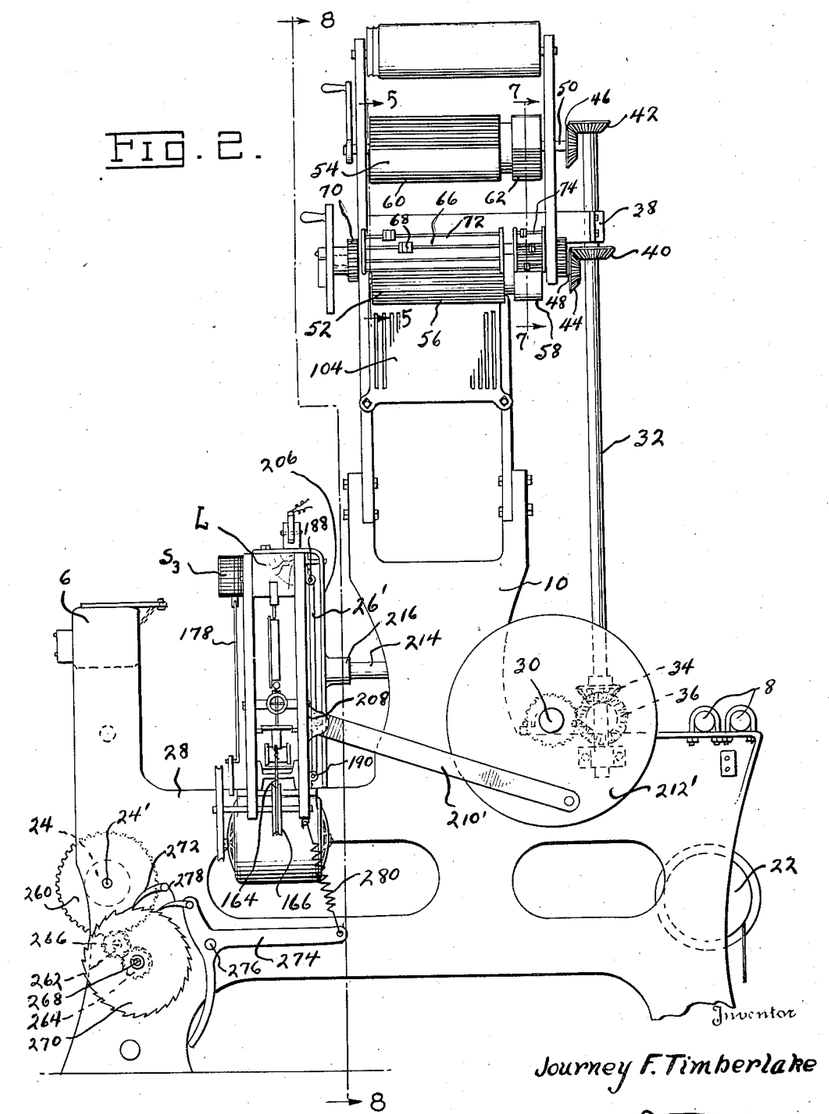
Fig. 2 is an elevational view of the right side of the same.

Referring now to the drawings and more particularly for the moment to Figs. 1 and 2, the the two frames 2 and 4 are located at, and form the sides of the loom. These side frames are held rigidly in spaced upright position by the breast beam 6 at the front or cloth end of the loom and by the warp beam 8 at the back.

A central solid portion 10 of each side frame 2 and 4 extends upwardly a short distance and is then bifurcated. The upper extremities of the side frames are rigidly connected by spaced horizontal parallel beams 12. The beams 12 are disposed a sufficient distance from the base of the frame to allow for proper suspension and adequate movement of the harnesses 14 and 16. The harnesses are supported by cords or the like some of which pass over the harness guide rollers mounted on the axles 18 and 20 journaled in the beams 12. The manner in which the position of the harnesses can be varied to change the shed will be described in detail later.

The shed, as is customary, is formed by two sets of warp threads which are let off from a weight tensioned horizontally disposed roller 22 located at the rear of the loom (see Fig. 2). This roller 22 revolves in journals in the side frames 2 and 4. The warp threads are directed upwardly to the warp beam 8 and then extend forwardly one set passing through eyes in the harness 14 and the other set through eyes in the harness 16. The warp threads then pass through the lay frame to the breast beam 6 and then downwardly to the take-up or cloth roll 24.

Since one harness will be in raised position and the other in lowered position, and since one set of warp threads passes through the eyes of one harness and the other set through the eyes of the other harness, it will be apparent that the two sets of warp threads will form a diamond shaped shed. The portion of the shed disposed forwardly of the harnesses is the portion through which the shuttle bearing the weft thread is caused to traverse.

The lay frame L is in the shape of a narrow elongated rectangle which extends horizontally across the loom to project beyond the side frames 2 and 4 as will be apparent from Fig. 1. This lay frame L houses the tracks of the shuttle mechanism and attached to the frame is the comb 26. The lay frame is adapted to be moved forwardly periodically by suitable mechanism so that the comb 26, through which the two sets of warp threads pass unhindered, will beat-up or force the weft thread deposited in the shed by the shuttle against the already woven portion of the fabric which passes over the breast beam 6.

During this forward and return movement of the lay frame L, the same is supported by and slides on the upper surfaces 28 of the forward portions of the side frames 2 and 4.

Now that the general set up of the loom has been described, the various operating parts of the loom will be described in greater detail with particular relation to the inventive features therein.

The harness operating mechanism is disposed at the right upper end of the loom as will be seen in Fig. 1. This mechanism which is also illustrated by Figs. 2, 5, 6, 7 and 8 is for the purpose of changing the position of the harnesses at the proper time. Also this portion of the loom embodies mechanism for controlling the pattern of the fabric being woven and mechanism for operating two of the control switches for the loom.

The power for actuating the harness operating mechanism is supplied by a constantly driven motor M3 (see Fig. 4) which through suitable means drives the horizontal drive shaft 30 which while journalled in the side frames 2 and 4 extends beyond these frames. Adjacent the right side frame 4 is the vertical drive shaft 32 which is operatively connected by gears 34 and 36 at its lower end to the horizontal drive shaft 30 to be constantly rotated thereby. The upper end of the shaft 32 is journalled in a bearing 38 attached to the upper portion of the right side frame 4. Bevel gears 40 and 42 are keyed to the vertical shaft 32 and are disposed below and above the bearing 38 respectively. These bevel gears 40 and 42 engage bevel gears 44 and 46 respectively which latter gears are rigidly mounted on the axles 48 and 50 of cylindrical roll gears 52 and 54 respectively.

This drive mechanism for the harness mechanism is somewhat similar to that shown in several old patents such as the patent to L. J. Knowles No. 134,992, issued January 21, 1873, and the patent to George F. Hutchins, No. 454,135, issued June 16, 1891. The harness mechanism described herein differs from these old mechanisms in several important respects. The mechanism which constitutes a part of this invention consists really in two mechanisms, the synchronized harness operating mechanism shown in section in Figs. 5 and 6, and the mercury switch position changing mechanism shown in Fig. 7.

Figure 5:
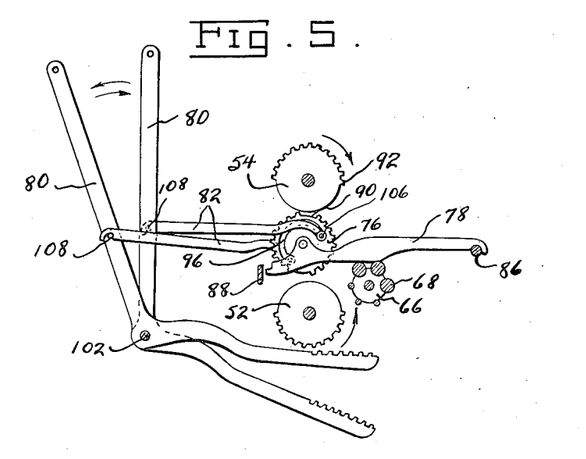
Fig. 5 is a schematic sectional view of the harness changing mechanism along line 5—5 of Fig. 2.
Figure 6:
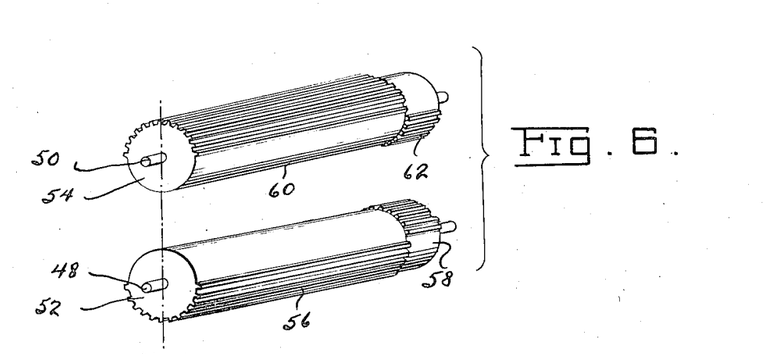
Fig. 6 is a perspective view of the cylindrical gear rolls.
Figure 7:
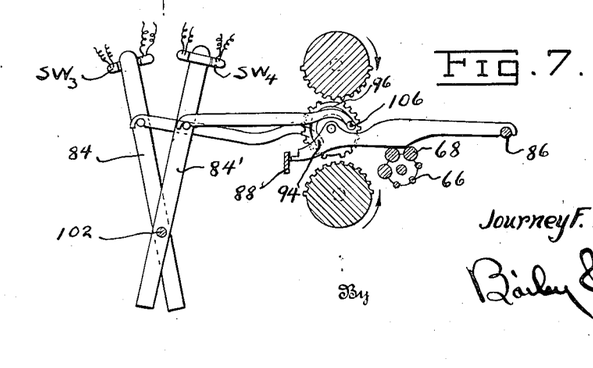
Fig. 7 is a schematic sectional view of the switch throwing mechanism along line 7—7 of Fig. 2.

As clearly shown in Figs. 5 to 7, inclusive, and the top of Fig. 2, the cylindrical gear rolls 52 and 54 are spaced one above the other in the same vertical plane and are journaled on suitable axles 48 and 50 in the frame. The cylindrical gear rolls are sectionalized into two cooperating portions or sections. The portions or sections 56 and 58 are on cylindrical gear roll 52, while the portions 60 and 62 are on cylindrical gear roll 54. The portions or sections 56 and 60 on cylindrical gear rolls 52 and 54 respectively correspond and cooperate as do the portions or sections 58 and 62 also respectively on these cylindrical gear rolls.

The portions or sections 56 and 60 and the portions or sections 58 and 62 are each provided with teeth upon substantially one half of their peripheries but the teeth on the latter two sections are set at 180° with respect to the teeth on sections 56 and 60.

The lower cylindrical gear roll axle 48 is provided with a gear 64 at the end opposite bevel gear 44. A pattern cylinder 66 with friction rolls 68 is journaled in the frame parallel with the cylindrical gear rolls but to one side of the vertical plane in which their axles are disposed, and is adapted to be rotated by engagement with gear 64 and the gear 70, the latter of which is attached to the pattern chain.

The pattern cylinder is more or less conventional except that, like the cylindrical gear rolls, it is sectionalized. Each of the sections is provided with rolls 68 which, for pattern changing purposes, are movably or slidably placed on longitudinal rods or axles 72 and 74 as is illustrated in Fig. 2. The sections of the pattern chain are also set at an angle to each other so that the vibrator gears 76 for the harness operating mechanism as well as those for the switch position changing mechanism will operate in synchronized relation. This is an important part of the invention from the standpoint of control.

For each harness there is a vibrator gear 76, a vibrator lever 78, a harness jack 80, and a harness jack lever or connecting rod 82. These elements are all shown in Fig. 5. From Fig. 7 it will be seen that there is one each of these elements for each switch rock arm 84, 84'.

Aside from the switch arms, these elements are assembled much in the manner disclosed in the patents to Knowles and to Hutchins mentioned supra. The vibrator levers 78 are disposed at right angles to the axes of the pattern chain and the cylindrical gear rolls. The outer end of each vibrator lever 78 is pivoted on a heel pin 86, the intermediate portion passes over the pattern cylinder and the inner end extends between the tines or teeth of a comb 88 attached to the frame. On the lower side of each of the vibrator levers 78 there is provided a flat friction cam surface which is adapted to contact with the pattern rolls. Each vibrator lever 78 carries a vibrator gear 76 rotatably mounted on an axle which is in substantially the same vertical plane as the axles 48 and 50 of the cylindrical gear rolls.

The diameter of each vibrator gear 76 is less than the distance between the outer surfaces of the two cylindrical gear rolls 52 and 54 and each vibrator gear is thus engageable with one only of these cylindrical gear rolls at a time as it is raised or lowered with its corresponding vibrator lever 78 which latter is actuated by the pattern rolls. The cylindrical gear rolls 52 and 54 run in opposite directions. When the pattern cylinder turns up a roll against a vibrator lever it lifts this lever and its corresponding vibrator gear against the upper cylindrical gear roll 54. Part of the periphery of each vibrator gear is without gear teeth so that the first teeth on the cylindrical gear roll to enter the opening 90 are the teeth 92. The succeeding or subsequent teeth of section 60 of the cylindrical gear roll 54 then engage the teeth on the vibrator gear as it is pressed upward, and the vibrator gear is rotated through 180° by the teeth on one half the periphery of section 60 of the cylindrical gear roll 54. A stop pin 94 on the vibrator lever 78 and a semi-circular slot 96 in the vibrator gear 76 prevent further movement which might be caused by inertia and by the counter balance weight 98 attached by the cable 100 to the harness jacks.

As shown in Fig. 5, the harness jacks 80 used are L-shaped levers pivoted on an axle 102 located between the upper cross beams 12, 12' inside of, and below the lower cylindrical gear roll 52 so that the horizontal stem of the lever extends below and at right angles to the axes of the cylindrical gear rolls and through a grid-like guide member 104 attached to the side frame. The vertical stem of each jack extends a considerable distance, approximately one foot above the upper cylindrical gear roll 54. It is a part of this invention that by increasing the length of this stem the size of the shed can be increased and consequently a larger shuttle can be used.

The harness jack connecting rods 82 are positioned between the vibrator gears 76 and the harness jacks 80. One end of each connecting rod 82 is rotatably secured to an axle 106 projecting from the face of each vibrator gear at a point near the periphery of the gear. Each connecting rod then extends horizontally to and is connected as at 108 by a loose pivot to the vertical stem of the corresponding harness jack. The axle 106 on each vibrator gear moves with the gear through 180° from an inner to an outer position or vice versa on a horizontal line. Thus the corresponding harness jack is reciprocated forward and backward toward and away from the center of the loom. This action through suitable cables lowers and lifts the harnesses as will be described.

The harness has also been arranged in such a manner as to increase the width of the shed. Referring now to Figs. 1 and 8 for each harness 14, 16 there is a harness jack 80. A cable 110 is secured at one end to the upper portion of the jack and the other end in one eye of a double-eyed sheave 112. A second short cable 114 is secured at one end to the other eye of sheave 112 while the other end of this short cable is secured to the single eye of a sheave 116. Cables 118 and 120 are attached to eyelets 122 and 124 on the upper cross beam of the harness 14, 16. From the eyelets 122 and 124 the cables 118 and 120 pass over rollers 126 and 128 through sheaves 112 and 116 and are dead ended on the side frame 2 opposite the harness operating mechanism.

It will be understood that the pattern chain can be varied so as to cause certain harnesses to be raised while others are lowered, since certain vibrator gears will be in contact with the teeth on the upper cylindrical gear roll while others are in engagement with teeth on the lower.

It will be apparent by those skilled in the art that the mechanism just described will operate to change the shed made up of sets of warp threads after each operation of the shuttle and each beating up of the weft as will be described more in detail later. As has already been suggested, the invention embodies control mechanism for the various operating parts which control mechanism is all tied up together so that each part of the loom will be accurately controlled with respect to every other part.

This control mechanism includes two mercury switches $SW_3$ and $SW_4$, the position of which is adapted to be changed at predetermined periods by movement of certain parts of the harness operating mechanism. The mechanism for movement of these mercury switches $SW_3$ and $SW_4$ is the same as that for the movement of the harness jacks 80 except that instead of L-shaped jacks 80 straight switch arms 84, 84' are provided which are pivoted on the axle 102. The switches $SW_3$ and $SW_4$ are secured to the upper ends of these switch arms 84, 84'. Movement of these arms and consequently of the switches is adapted to effect certain changes in various electrical control circuits to be described hereinafter.

The sections of the pattern roll which affect the vibrator gears and those portions of the cylinder gear rolls which cause the harnesses to change position are set at 180° to those sections of the pattern roll which through vibrator gears and other portions of the cylindrical gear rolls effect movement of the switch arms 84, 84' and consequently of the switches $SW_3$ and $SW_4$. These switches are thus rocked and certain circuits are made and opened after the shed has been changed. In particular, the shed is changed during one half of a revolution of the cylindrical gear rolls while the switches are rocked during the remaining one half of a revolution of the cylindrical gear rolls.

Some of the control circuits in which the switches SW₃ and SW₄ are disposed are circuits which influence the operation of the shuttle which carries the weft thread through the shed.

The shuttle 130 is designed to be moved on tracks in the lay frame. The lay frame, as will be clear from Figs. 1 and 2, extends beyond the side frames 2, 4 of the loom. The lower face of the lay beam 132 supports two motors M₁ and M₂. The motor M₁ is disposed at the left end of the lay frame and is for drawing the shuttle 130 from right to left while the motor M₂ is disposed at the right end of the lay frame and is adapted to draw the shuttle from left to right.

While various types of shuttle motions can be used herein without departing from the spirit of the invention, the shuttle motions disclosed in my copending application Serial No. 57,043, filed December 31, 1935, and in my Patent No. 2,002,194, issued May 21, 1935, are preferred. That is particularly true of the shuttle motion disclosed in my copending application which illustrates a shuttle motion mounted in tracks in the lay frame. In that arrangement the motors are mounted as described above.

The shafts of motors M₁ and M₂ are equipped with grooved pulleys 134 and 136. Other pulleys 138 and 140 rigidly mounted on shafts 142 and 144 respectively are also provided. The shafts 142 and 144 are journalled for rotation at the outer left and right ends of the lay frame and are disposed parallel to the motor shafts and at right angles to the path of movement of the shuttle.

Belts 146 and 148 connect the pulleys 134 and 136 with the pulleys 138 and 140. Normally this arrangement is such that the belts will slip on the pulleys. However, these belts are adapted to be tightened and consequently to cause the pulleys 138 and 140 to rotate shafts 142 and 144 respectively. The belt tightening arrangement is comprised of the friction pulleys 150 and 152 rotatably mounted on levers 154 and 156. The levers are pivotally mounted at their centers on pins projecting outwardly or forwardly from the lay frame. The ends of these levers opposite the friction pulleys are linked to the solenoids S₃ and S₄ respectively. Energization of either of these solenoids S₃ or S₄ will cause its corresponding lever 154 or 156 to be actuated and this in turn causes the respective friction pulley to engage the respective belt 148 or 150 to tighten the same. Consequently, the shaft 142 or the shaft 144 will be rotated as both motors M₁ and M₂ are adapted to operate constantly.

It is not believed necessary to describe the shuttle mechanism specifically. For such a description reference may be made to my copending application, Serial No. 57,043 mentioned above. It should be mentioned here, however, that the shuttle 130 is operatively connected with a shuttle actuating car 158 which latter is moved through the shed to move the shuttle 130 with it.

The shuttle actuating car 158 has two cables attached to it. The cable 160 connected to its left end passes over a drum or reel 162 rigidly mounted on the shaft 142, while the cable 164 secured to the other end of the shuttle actuating car 158 passes over a drum or reel 166 rigidly mounted on the shaft 144.

From this brief description of the shuttle mechanism it will be apparent that energization of the solenoid S₄ will result in driving the shaft 142 and in reeling in the cable on the drum 162 to pull the shuttle actuating car 158 thereto. Obversely, energization of the solenoid S₃ will effect rotation of shaft 144 and drum 164 to reel in the cable 164 and consequently to pull the shuttle actuating car 158 and through it the shuttle 130 from left to right. It is also manifest that while the cable 160 is being wound on drum 162 the cable 164 will be played out from drum 166, and while cable 164 is being reeled in on drum 166 the other cable will be played off drum 162.

The solenoids S₃ and S₄ mentioned are shown in the drawings as mounted on the front side of the lay frame. This is merely for ease of description and clarity. In actual practice it is intended that they, as well as the pulleys and belts which they affect, shall be placed on the back side of the lay frame where they will be out of the way and so as to give unobstructed room for bobbin replacement.

The upper surface of the lay frame affords support for the mercury switches SW₁ and SW₂ which, as will be described, are connected in control circuits some of which when closed effect energization of the solenoids S₃ and S₄ which control actuation of the shuttle.

Both mercury switches SW₁ and SW₂ are of the tilting variety having a pair of contacts at each end. The switch SW₁ is disposed at the left end of the lay frame while the switch SW₂ is positioned at the right end. Levers 168 and 170 respectively are pivoted at their centers on axles projecting from upright brackets 172 and 174 respectively. The levers 168 and 170 at one end carry the mercury switch SW₁ and SW₂ respectively, while at the other ends are connected respectively the links 176 and 178 which extend downwardly into the path of the shuttle actuating car 158. The link end of the levers 168 and 170 are each weight or spring restrained so that these levers normally assume an oblique position with the switch end up. Switch SW₁ is shown in this position at the left end of Fig. 1.

The switches are tilted the other way in this manner. As the shuttle reaches its rest position at the end of its path of movement in the lay frame the shuttle actuating car 158 strikes the pin 176 or 178 as the case may be. The car 158 is provided with a cam surface 180 so that the respective pin will consequently be lifted to tilt the corresponding switch. The mercury in the switch runs to the now lowered end and a new control circuit is made.

The formation of the shed and the manner in which it is changed has already been described. Also, the manner in which the shuttle carries the weft thread through the shed has been explained. After the weft thread has been run through the shed, it is necessary to force it or pack it up tightly against the fabric already completed. The manner in which this is accomplished will now be described.

The lay frame has already been described as an elongated rectangle. It is made up of the cross beams 182 and 184 and the end bars 186 which hold the cross beams apart. It is desirable that the lay frame shall extend at each end beyond the side frames 2 and 4. As will be seen from Figs. 1 and 2, this frame carries the tracks by which the shuttle 130 and shuttle actuating car 158 are guided in their passage through the shed.

The lay frame (see Fig. 2) is disposed between the harness 14, 16 and the breast beam 6. The upper and lower sets of the warp threads forming the shed are adapted to pass unhindered through the lay in such a way that the lay frame can be moved forwardly or backwardly without interfering with the warp threads and also so that the shed can be changed without interference from the lay frame, or the elements thereon.

The lay frame carries a beat-up comb 26 made up of a great plurality of comb elements 26'. These are disposed in spaced parallel position to the rear of the lay frame to which they are secured by two long bolts 188, 190 which in turn are supported by upper and lower brackets 192 and 194. The comb elements are provided with apertures at their upper and lower ends through which these bolts pass. The elements 26' may be spaced apart by any suitable means such as by washers. The spaces between the individual comb elements 26' are such as to permit the warp threads to pass therethrough and be moved freely up and down therein when the shed is changed.

It should be clear that when the lay frame is moved forwardly as a unit the comb elements will also move forwardly and will force the weft thread which has been deposited in the shed up against the fabric which has already been woven.

During its forward and backward movement the lay frame rides on the upper surfaces 28 of the front intermediate portions of the side frames 2 and 4. This is clearly shown in Figs. 2 and 9. Additional support for the lay frame as well as a guide for the movement thereof is formed by the tubular tracks 196 and 198 which are spaced inwardly from the inner surfaces of the side frames 2 and 4 respectively to which they are rigidly secured by the brackets such as at 200. Swung from the bottom of the lower cross beam 184 of the lay frame on brackets 202 so as to be freely rotatable are wheels 204 with a grooved periphery. These wheels fit snugly on the tubular tracks 196 and 198.

It is also necessary or at least advisable to guide and support the upper portion of the lay frame to prevent it from toppling over when it moves to beat up the weft. In Fig. 9 there is shown a substantially U-shaped steel upright 206 which is used for this purpose, the legs of the U being secured to the top and bottom cross beams 182 and 184 of the lay frame so that the intermediate portion of the upright is spaced from the rear face of the lay frame.

Two of such uprights may be employed in which case one is attached to the lay frame at each side in the manner described. The U-shaped uprights are of sufficient width to support the brackets 208 to which the drive rods 210, 210' on the outside side frame 2 are pivotally attached. The other ends of the drive rods 210, 210' are eccentrically secured to drive wheels 212 which are rotated by mechanism to be described.

For the purpose of guiding the motion of the lay there is also provided one or more guide rods 214 secured to the U-shaped uprights 206 by sockets 216, which guide rods are slidably mounted and supported in substantially horizontal cylindrical sleeves 218 secured to the inner side of the side frames 2 and 4 of the loom. If desirable these guide rods 214 and their sleeves 218 may be mounted on the outer side of the side frames 2 and 4, but in this case they must be disposed high enough to clear the drive wheels 212, 212'.

The operation of the lay as the result of rotation of the drive wheels 212, 212' will be clearly understood by those versed in the art. After the shuttle has completed its movement through the shed leaving behind it a weft thread, the drive wheels 212, 212' are rotated by mechanism to be described. The driving rods 210, 210' consequently force the lay frame unit forwardly toward the breast beam 6 on the tracks 196 and 198 and the surface 28 of the side frames 2 and 4. The guide rods 214 serve to make the movement smooth and straight while they also serve to prevent the lay frame from toppling over.

After a short forward movement the comb elements 26' carried by the lay frame engage the weft thread and continued forward movement of the lay frame will carry the weft thread toward the fabric already formed and will force it snugly in place. To the uninitiated, this is called "beating up the weft".

To accomplish what has been described, the drive wheels 212, 212' have rotated one half of one revolution. On the other half of the revolution the lay, because of the eccentric mounting of the drive rods 210, 210' will be returned to starting position.

The drive wheels 212, 212' are rigidly mounted on the ends of the horizontal drive shaft 30 which is journaled in the side frames 2 and 4. At one end, preferably the left end, looking at the loom from the front, the shaft 30 is adapted to be driven by the motor M₃ through a suitable clutch mechanism. This arrangement is clearly shown in Figs. 3, 4 and 4a to which reference will now be made.

Figure 3:
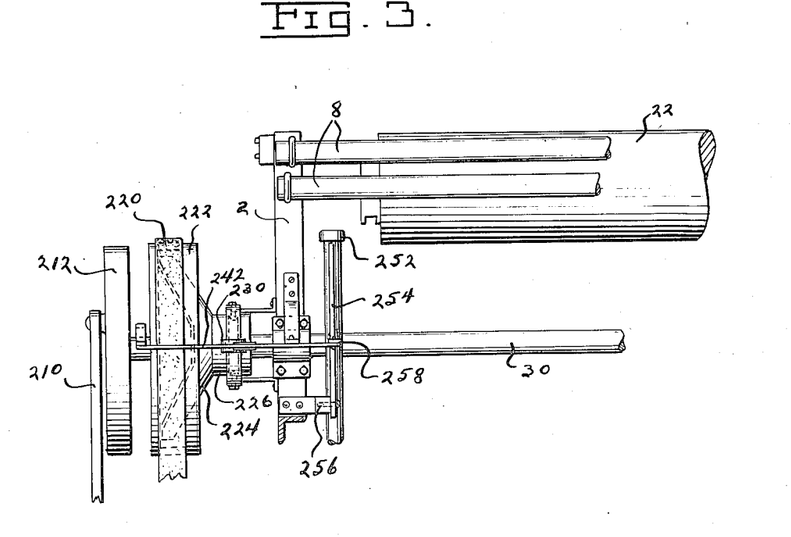
Fig. 3 is a plan view of the clutch and stop mechanism.
Figures 4, 4A:
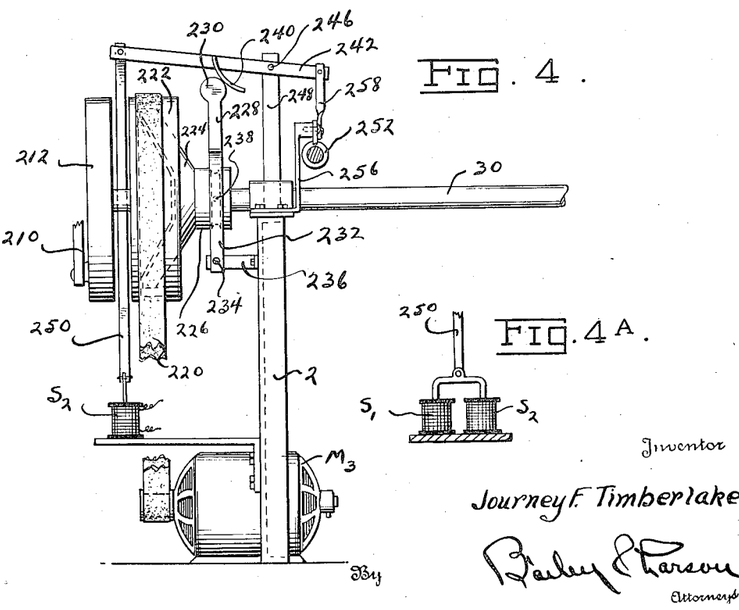
Fig. 4 is an elevational view of the mechanism shown in Fig. 3.
Fig. 4a is an elevational view of a side of the clutch solenoid.

From Fig. 4, which is a front elevation of the arrangement mentioned, it will be seen that the constantly running motor M₃ through the pulley belt 220 is adapted to rotate the outer clutch drum 222 which is mounted for free rotation about the axis of the shaft 30. This outer clutch drum 222, however, is adapted to be engaged by an inner clutch member 224 connected to the clutch sleeve 226 which in turn is keyed to the shaft 30 so as to rotate therewith but also so as to be capable of axial movement with respect to the shaft. Movement of the sleeve 226 and the inner clutch member 224 toward the left (see Figs. 3 and 4) will cause the inner clutch member 224 to engage the outer clutch drum 222 frictionally and consequently results in rotation of the shaft 30.

This axial movement of the clutch sleeve 226 and the inner clutch member 224 is accomplished by movement of the arm 228. This arm 228 is provided at its upper end with a friction wheel or surface 230. As the arm extends downwardly it is bifurcated to form a yoke 232 which straddles the clutch sleeve 226. The lower ends of the yoke are pivoted as at 234 to brackets 236 rigid with the side frame 2. The sleeve 226 is provided with a peripheral groove which is adapted to be engaged by pins 238 extending inwardly from the yoke.

The arm 228 is adapted to be swung on its pivot points 234 to cause the inner and outer clutch elements to engage. This radial movement is effected by an element 240 depending from the lever 242 which is pivoted at 246 to the support 248 rigid with the side frame 2. The left end of the lever 242 is attached by means of a strap or the like 250 to the solenoids S₁ and S₂ (see Figs. 4 and 4a). Energization of either of these solenoids will result in pulling down the strap 250, the lever 242 and the element 240 thereon. The element 240 thus engages the friction wheel or surface 230 and this, as described, causes the clutch to engage so that the shaft 30 will be rotated. It will thus be apparent that operation of the lay through the drive rods 210, 210', drive wheels 212, 212', and shaft 30, will only occur when one or the other of solenoids $S_1$, $S_2$ is energized.

It will be understood that when the clutch is engaged it drives shaft 30 and vertical shaft 32 and consequently the harness changing mechanism.

A mechanical stop is provided which prevents the lay from moving forward accidentally. This mechanism likewise is shown in Figs. 3 and 4 and also in Fig. 9.

The free or rear end of the guide rod 214 is provided with a flange 252. A weighted lever 254 is arranged parallel with and directly above the guide rod 214 with one end pivotally attached to a bracket extending from the side frame 2 of the loom as at 256. The other end of the lever 254 is free and normally rests upon the guide rod 214 and against the inner face of the flange 252 when the lay is at rest, and it thus prevents forward movement of the lay.

The stop lever 254 is connected by a link 258 to the lever 242. As will be clear from Fig. 3 the lever 242 and the lever 254 are arranged at right angles to each other. Energization of either of the solenoids $S_1$ or $S_2$ will not only cause the left end of lever 242 to move downwardly to engage the clutch as described but will also raise the right end of lever 242 and consequently the stop lever 254 so that the lay may move forward.

It is within the scope of the invention to use an electric brake in place of the stop mechanism described. The electric brake or the stop mechanism described is provided merely as a safety factor to hold the lay stationary at all times except at such times as it is to move forward to beat up the weft.

Aside from the control circuits the general operating parts of the loom have been described. It has been explained how the harnesses are operated to form and change the shed; also how the shuttle travels through the shed to deposit the weft; and finally how the lay moves to beat up the weft.

It is advisable in looms of this general type to have a take-up mechanism which winds up the cloth or fabric roll upon which the fabric woven is finally deposited. In Fig. 2 there is shown a novel type of take-up mechanism which is a part of this invention.

The take up roll axle 24' at its right end has mounted thereon a gear 260. This gear is positioned near the inside surface of the side frame 4. The same is true of the gears 262 and 264, the former of which is an idler gear mounted for free rotation on a short stub shaft 266, and the latter of which is rigidly mounted on the shaft 268. The idler gear 262 engages both gears 260 and 264. The shaft 268 extends through the side frame 4 and on its outer end is rigidly mounted the ratchet wheel 270 adapted to be held in position by the pawl 272.

The reference numeral 274 represents a lever pivoted at 276. This lever has both a horizontal arm and a vertical arm. The upper end of the vertical arm of the lever 274 is provided with a pawl 278 which also engages the ratchet wheel 270. The free end of the horizontal stem is attached to one end of a spring 280, the other end of which spring is attached to the lower beam of the lay frame.

As the lay frame is moved forwardly to beat up the weft the spring becomes taut and lifts the lever 274 and this in turn through the pawl 278, ratchet wheel 270 and gears 264, 262 and 260 rotates the take-up roll axle 24' a fraction of a revolution. Thus, forward motion of the lay frame will result in a fractional rotation of the take-up roll. According to this novel arrangement a tension on the warp threads equal to the extension strength of the spring will prevent any take-up. When the warp threads are slack the spring tension will not be overcome and the lever will be lifted. Only a little experimentation will be required to determine the proper resilient spring to be used for any desired tension on the warp threads.

It is obvious that other take-up mechanisms can be employed to effect fractional rotation every time the lay moves forwardly. For example, a cord could be stretched from the free end of the lever 274 to a point on the side frame some distance below the breast beam 6. Forward motion of the lay frame would result in striking this cord and in actuating the lever 274.

The arrangement described above and illustrated in Fig. 2 is of particular advantage since it operates only when the warp threads are slack.

In the general description of the invention it has been indicated that the various elements of the loom are so controlled that each will perform its proper function at the correct time. This control is effected so that one operating part of the loom cannot commence operation until the other parts have finished. Reference is now made to Figs. 10 through 17 of the drawings. Figs. 10 through 13 show the electric circuits, while Figs. 14 through 17 which correspond respectively to Figs. 10 through 13 show schematically the positions of the various elements at different times of the control operation of the loom.

The motors $M_1$, $M_2$ and $M_3$ are disposed in the main line so as to be in constant operation. The motor $M_1$ is the motor at the lower left end of the lay (as disclosed in Fig. 1) which is for the purpose of operating the shuttle motion mechanism to draw the shuttle from right to left. Motor $M_2$ is the motor at the right hand end of the lay which is for the purpose of drawing the shuttle from left to right, while motor $M_3$ is the motor which drives the shaft 30, and consequently the lay operating mechanism and the harness operating mechanism as is disclosed in Figs. 2, 3, 4 and 9.

Figure 10:
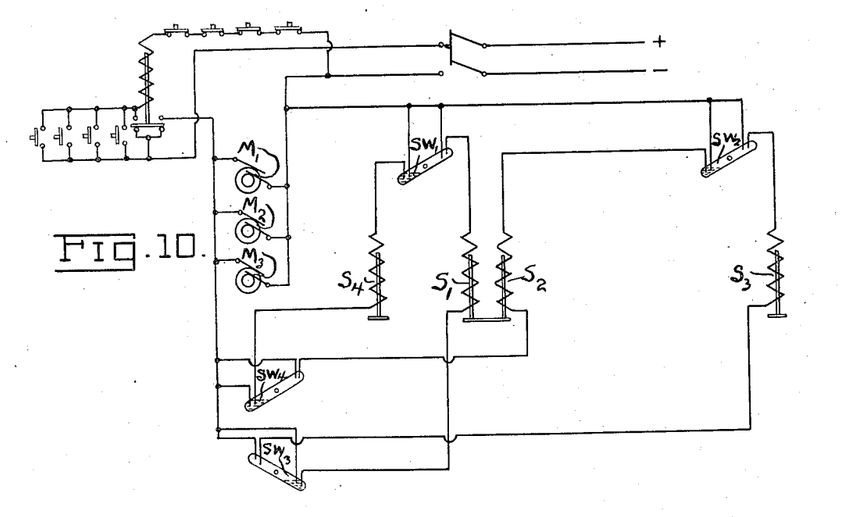
Figs. 10, 11, 12 and 13 are circuit diagrams of the various control circuits.
Figure 14:
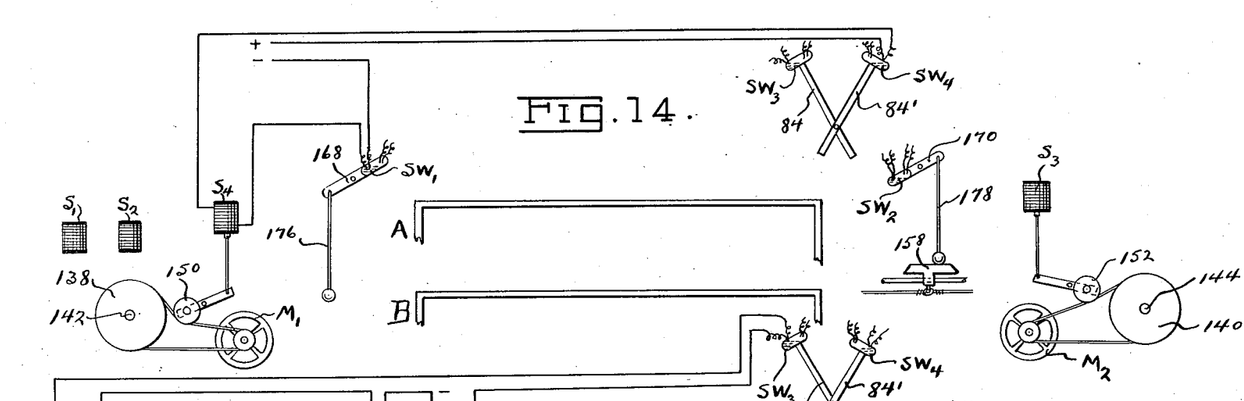
Figs. 14, 15, 16 and 17 are schematic views showing the positions of the elements of the loom corresponding to the respective circuits of Figs. 10 through 13 respectively.

The electric control circuit includes four mercury switches of the tilting variety. Each of these tilting mercury switches is provided with two pairs of contacts. Depending on the position of the mercury switch one or the other of these pairs of contacts will be connected by liquid mercury. Mercury switch $SW_1$ is the mercury switch disclosed at the left end of the lay, while mercury switch $SW_2$ is the switch shown at the right hand end of the lay. Both of these switches have a normal position and an abnormal position. In Figs. 1, 10 and 14 the switch $SW_1$ is shown in normal position while the switch $SW_2$ is shown in abnormal position. Abnormal position is effected when the shuttle reaches a position beneath the particular switch. In the present instance as disclosed in Figs. 1 and 14, this abnormal position is effected by the shuttle actuating car 158 which raises the pin 178, and consequently tilts the lever 170 and the switch $SW_2$ as shown in Figs. 1 and 14.

The other two mercury switches $SW_3$ and $SW_4$ are mounted on the upper ends of the switch arms 84 and 84' on the harness mechanism shown at the right hand upper corner of the loom. The circuits diagrammatically show four solenoids.

Solenoids S1 and S2 are the solenoids which are employed for the purpose of actuating the clutch which in turn effects the movement of the lay. These solenoids are shown in Figs. 4 and 4a of the drawings.

Solenoids S3 and S4 are disposed on the upper cross beam of the lay as indicated in Fig. 1. These solenoids when actuated will operate the pressure pulleys 150 and 152 to tighten the belts 146 and 148 respectively to drive the drums or reels 162 and 166 respectively. These drums, as described previously, have cables attached thereto and when actuated will draw the cables, and consequently the shuttle actuating car 158 in one direction or the other as the case may be.

Referring now to Figs. 10 and 14, the complete operation of the loom insofar as the electric control is concerned will be described. It is assumed that the shuttle is at the right hand end of the lay in the position shown in Fig. 1 of the drawings. The shuttle being in this position holds the switch SW2 in abnormal position. The current will then flow through the switch SW1, through the solenoid S4, and through the switch SW4, and back to the main line to complete a circuit. The completion of this circuit energizes the solenoid S4 which in turn operates the pressure pulley 150 (Fig. 14) on the left side of the lay and causes the shuttle to be drawn from right to left. Figs. 10 and 14 thus show position 1.

Figure 11:
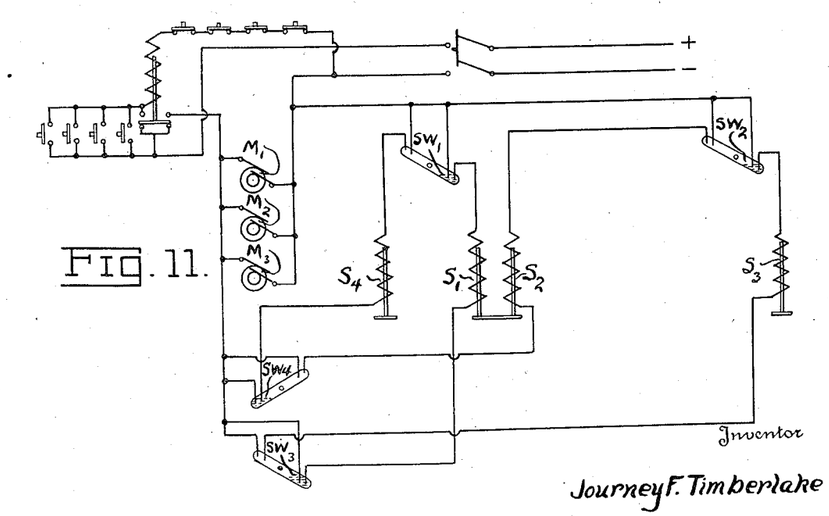
Figure 15:
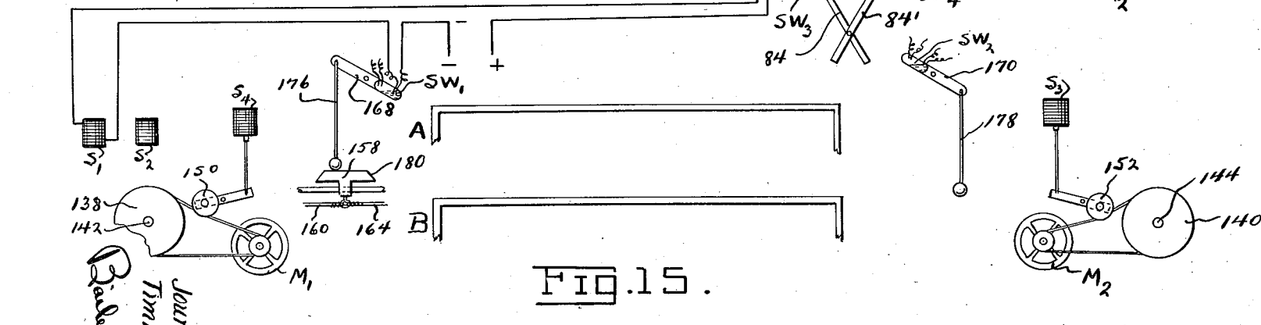

Position 2 is illustrated in Figs. 11 and 15. As the shuttle leaves its position at the right of the lay it permits the switch SW2 to return to its normal position as shown in these figures. As the shuttle reaches the end of its leftward movement it causes the switch SW1 to assume its abnormal position as shown in these figures. The current now runs from the main line through the switch SW1, the solenoid S1, the switch SW3, and back to the main line completing another circuit. The completion of this circuit results in energizing the solenoid S1 and this is the solenoid which operates the inner clutch member 224 (Figs. 3 and 4) to operate the lay mechanism. The lay is thus caused to move forwardly to beat up the weft and then to return to its original position.

Figure 12:
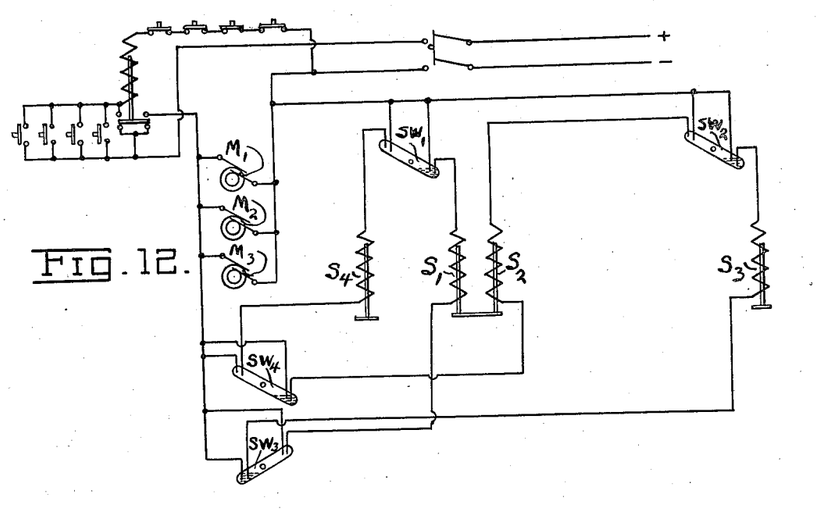
Figures 16, 17:
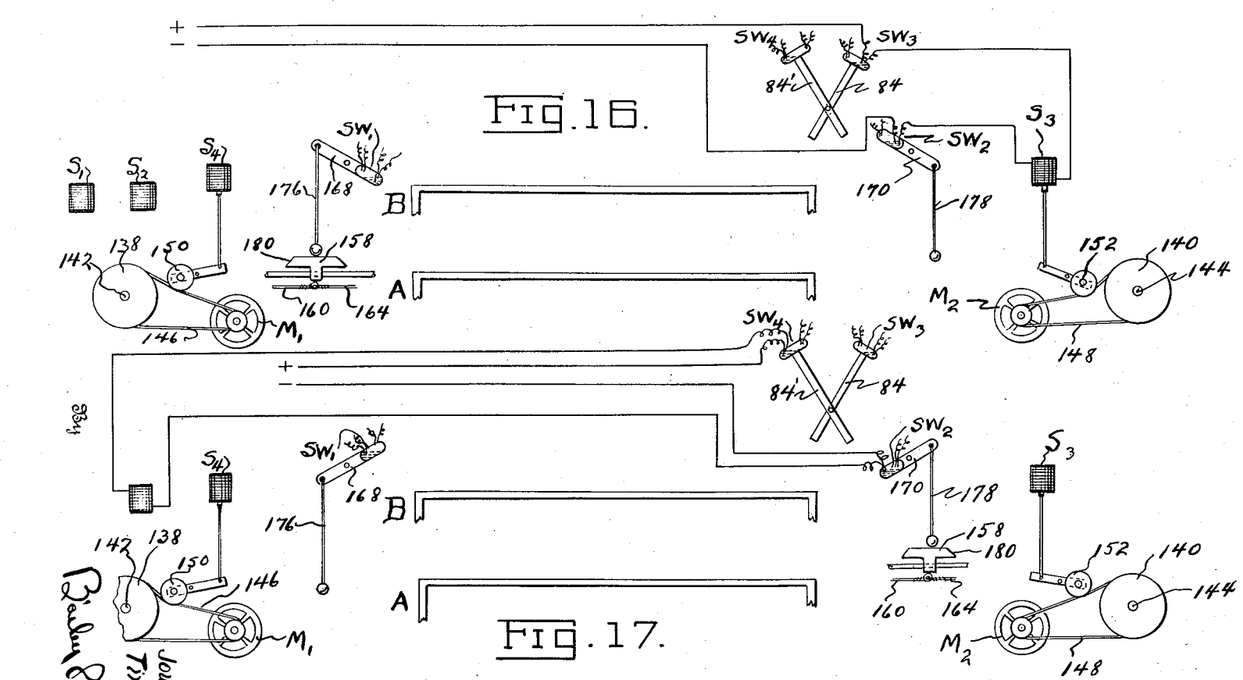

Reference is now had to Figs. 12 and 16 respectilvely which show the third position. After the lay has finished beating up the weft and has returned to its original position the harness mechanism operates to change the shed and as this is completed the harness mechanism then operates to change the position of the switch arms 84 and 84', and consequently the position of the switches SW3 and SW4 to the positions shown in these Figs. 12 and 16. The change that has been effected in the shed is indicated in Fig. 16 by the reversal of the elements A and B which indicate the harnesses.

The current now flows from the main line through the switch SW2, the solenoid S3 and the switch SW3, and back to the main line completing another circuit. The completion of this circuit energizes the solenoid S3 and the energization of this solenoid actuates the pressure pulley 152 at the right hand end of the lay (Fig. 1) so as to cause the shuttle to be drawn from left to right.

Figure 13:
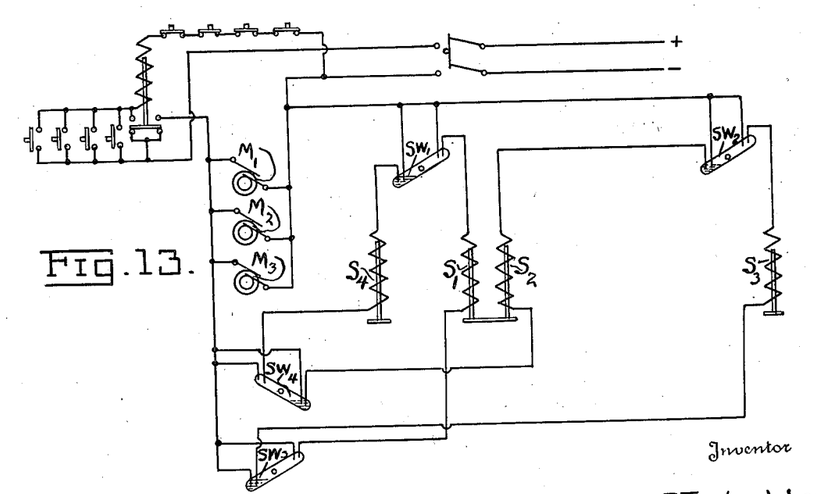

The last position 4 is indicated in Figs. 13 and 17 of the drawings. The shuttle as it leaves its position at the left of the lay releases the switch SW1 so that it will return to its normal position. When the shuttle reaches the position at the right it causes the switch SW2 to assume its abnormal position. The current now runs from the main line through the switch SW2, the solenoids S2, the switch SW4, and back to the main line completing another circuit. The completion of this circuit energizes solenoid S2. This solenoid is one of the solenoids which, when energized, actuates the inner clutch member 224, and consequently the lay mechanism so that the lay operates to beat up the weft.

After the lay finishes its operation and returns to its original position, the harness mechanism changes the shed and then the position of the switch arms 84 and 84', and consequently of the switches SW3 and SW4. When this has been done the arrangement is then in the original starting position illustrated in Figs. 10 and 14.

Figs. 10 to 14 inclusive at their upper left corners show stop and start switches disposed in the main line. These switches may be disposed at various points on the loom where they may be conveniently reached when needed. Their operation is manual and they do not affect the circuit control described except to shut off all the power or turn it on.

While I have described the preferred form of my invention it will be understood that I do not limit myself thereto but I reserve to myself the right to make all changes and substitutions coming within the broad spirit thereof.

Having now described my invention, what I claim as new and desire to secure by Letters Patent of the United States is:

1. A control arrangement for a loom comprising a plurality of electric control circuits only one of which may be closed at a given time and the closing of each one of which controls an operation of a corresponding part of the loom there being one each for controlling the operation of the shuttle in each direction and at least one other for controlling a part of the loom other than the shuttle, a plurality of electric switches disposed in said circuits, each of said switches having a plurality of pairs of contacts and connected in more than one circuit, each of said switches being adapted to be actuated by the operation of a part of the loom, the actuation of each switch to close one pair of contacts effecting the closing of a new circuit, and consequently the operation of another part of the loom.

2. In a loom having a plurality of harnesses for forming a shed of warp threads, a shuttle for depositing weft threads in the shed, a lay with comb for beating up the weft threads, and means for changing the position of the harnesses to change the shed, a control arrangement comprising, a plurality of electric control circuits only one of which can be closed at a given time, each one of said electric circuits when closed effecting actuation of a part of the loom, there being one circuit controlling the actuation of the shuttle in each direction, and one each controlling the operation of the lay before each change of shed, a plurality of tilting mercury switches disposed in said circuits, each of said switches having a pair of contacts at each end, one of said switches being disposed in the path of said shuttle to be actuated thereby as the shuttle reaches one end of its path, another of said switches being disposed in the path of said shuttle to be actuated thereby as the shuttle reaches the other end of its path, and a switch for each harness and adapted to be actuated by the harness actuating means after the lay has acted to beat up a weft thread, the actuation of each switch to close one pair of contacts thereof effecting the closing of a new circuit and consequently the operation of another part of the loom.

3. An electric control for looms having a plurality of harnesses, a shuttle, and a lay, and harness changing mechanism, said control comprising, a circuit for effecting actuation of the shuttle in one direction, a circuit for effecting actuation of the shuttle in the other direction, a circuit for effecting actuation of the lay and harness changing mechanism after the shuttle has completed its movement in one direction, a circuit for effecting actuation of the lay and harness changing mechanism after the shuttle has completed its movement in the other direction, and a plurality of switches in said circuits and disposed so as to be actuated by moving parts of the loom to prevent more than one circuit from being closed at a given time.

4. An electric control for looms having a plurality of harnesses, a shuttle, and a lay, and harness changing mechanism, said control comprising, a circuit for effecting actuation of the shuttle in one direction, a circuit for effecting actuation of the shuttle in the other direction, a circuit for effecting actuation of the lay and harness changing mechanism after the shuttle has completed its movement in one direction, a circuit for effecting actuation of the lay and harness changing mechanism after the shuttle has completed its movement in the other direction, and a plurality of switches in said circuits and means on the loom to actuate certain of said switches upon completion of a given operation of the loom to complete said circuits but one at a time and in predetermined order.

5. In a loom, a plurality of harnesses, means for changing the position of said harnesses, a lay, means for actuating said lay, a shuttle, means for actuating said shuttle in one direction, means for actuating said shuttle in the other direction, solenoids for each of said means, a motor for driving said harness position changing means and said lay actuating means, a motor for driving said shuttle actuating means for one direction of shuttle motion, a motor for driving said shuttle actuating means for the other direction of shuttle motion, and a plurality of electric circuits including said solenoids and controlled by moving parts of the loom to energize the solenoids for each of the said means progressively to cause the respective motors for said means to drive the same.

6. In a loom, a plurality of harnesses, means for changing the position of said harnesses, a lay, means for actuating said lay, a shuttle, means for actuating said shuttle in one direction, means for actuating said shuttle in the other direction, solenoids for each of said means, a motor for driving said harness position changing means and said lay actuating means, a motor for driving said shuttle actuating means for one direction of shuttle motion, a motor for driving said shuttle actuating means for the other direction of shuttle motion, a plurality of electric circuits including said solenoids and controlled by moving parts of the loom to energize the solenoids for each of the said means progressively to cause the respective motors for said means to drive the same, and means in said circuits for preventing the energization of more than one solenoid at any given time.

7. In a loom having a lay, harnesses, and a shuttle, an electric control circuit including a solenoid for effecting movement of the shuttle in one direction, at least one other electric circuit for controlling a part of the loom other than the shuttle, a plurality of switches in said circuits each of which must be in a predetermined position before the shuttle controlling circuit will be closed and the solenoid energized, and means operative after the lay has beat up the weft and the position of the harnesses has been changed to bring the position of the switches into accord to close the circuit.

8. In a loom having a lay, a shuttle, harnesses, and mechanism for changing the position of the harnesses, an electric control circuit including a solenoid for effecting movement of the shuttle in one direction, at least one other electric circuit for controlling a part of the loom other than the shuttle, a plurality of switches in said circuit each of which must be in a predetermined position before the shuttle controlling circuit will be closed and the solenoid energized, and means operative after the lay has beat up the weft and the position of the harnesses has been changed to bring the position of the switches into accord to close the circuit, said means being operatively connected with said harness position changing mechanism.

9. In an electric control system for looms, having a shuttle, a lay, harnesses, and harness changing mechanism, a continuously closed circuit, three prime movers connected in said circuit, one for operating the shuttle in one direction, one for operating the shuttle in the other direction, and one for actuating the lay and harness changing mechanism, a plurality of normally broken circuits tapped from said closed circuit adapted to be closed singly and in a predetermined order, mechanical means disposed in the path of shuttle and harness changing mechanism adapted to close said normally open circuits singly and in predetermined order.

10. An electric control for looms having a plurality of harnesses, a shuttle, a lay, and a harness changing mechanism, means for actuating the shuttle in one direction, a prime mover for said means, means for actuating the shuttle in the other direction, a prime mover for said last mentioned means, means for actuating the lay and the harness changing mechanism, a prime mover for said lay and harness changing mechanism means, said means for actuating the shuttle in the first direction including a circuit having a solenoid, said means for actuating the shuttle in the other direction including a circuit having a solenoid, said means for actuating the lay and harness changing mechanism including a pair of circuits each having a solenoid, and means in said circuits and common to more than one of said circuits for preventing more than one circuit being closed at a time.

11. An electric control for looms having a plurality of harnesses, a shuttle, and a lay, a harness changing mechanism, means for actuating the shuttle in one direction, a prime mover for said means, means for actuating the shuttle in the other direction, a prime mover for said last mentioned means, means for actuating the lay and the harness changing mechanism, a prime mover for said lay and harness changing mechanism means, said means for actuating the shuttle in the first direction including a circuit having a solenoid, said means for actuating the shuttle in the other direction including a circuit having a solenoid, said means for actuating the lay and harness changing mechanism including a pair of circuits each having a solenoid, and a plurality of switches in said circuits each being common to at least two circuits and adapted to be actuated respectively by the shuttle and the harness changing mechanism for preventing more than one circuit being closed at any one time.

12. An electric control for looms having a plurality of harnesses and means for changing the position of the harnesses, said control comprising a plurality of electric circuits one for controlling the operation of the shuttle in one direction, one for controlling the operation of the shuttle in the other direction, and at least one other circuit for controlling the operation of a part of the loom other than the shuttle, two switches each in at least two of said circuits, and means associated with the harness changing mechanism for changing the position of said switches after the position of the harnesses has been changed.

13. An electric control for looms having a plurality of harnesses, a shuttle, a lay, a harness changing mechanism, said control comprising a first circuit for controlling the shuttle in one direction, a second circuit for controlling the shuttle in the other direction, a third circuit for controlling the lay and position of the harnesses, a fourth circuit for controlling the lay and harness changing mechanism, two switches, means associated with the harness changing mechanism for changing the position of said switches after the position of the harnesses has been changed, said switches being respectively in the first and fourth circuits and the second and third circuits.

JOURNEY F. TIMBERLAKE.